J. A. DAVIDSON.
ANIMAL TRAP.
APPLICATION FILED MAY 2, 1917.

1,265,305. Patented May 7, 1918.

Inventor.
J. A. Davidson

UNITED STATES PATENT OFFICE.

JACOB A. DAVIDSON, OF TORONTO, ONTARIO, CANADA.

ANIMAL-TRAP.

1,265,305.

Specification of Letters Patent.

Patented May 7, 1918.

Application filed May 2, 1917. Serial No. 165,977.

*To all whom it may concern:*

Be it known that I, JACOB ALEXANDER DAVIDSON, a subject of the King of Great Britain, and resident of the city of Toronto, county of York, Province of Ontario, in the Dominion of Canada, have invented certain new and useful Improvements in Animal-Traps, described in the following specification and illustrated in the accompanying drawings, that form part of the same.

The objects of this invention are to provide a form of trap for catching small animals such as rabbits, mink, muskrat, etc., which will be very effective being extremely sensitive and of very light and strong construction and also very simple and cheap to construct.

The principal feature of the invention consists in the novel shaping of a length of spring wire whereby a pair of hook shaped impaling members are adapted to spring together and whereby said hook members are held in an open position by a pair of rods abutting at their inner ends.

Figure 1:
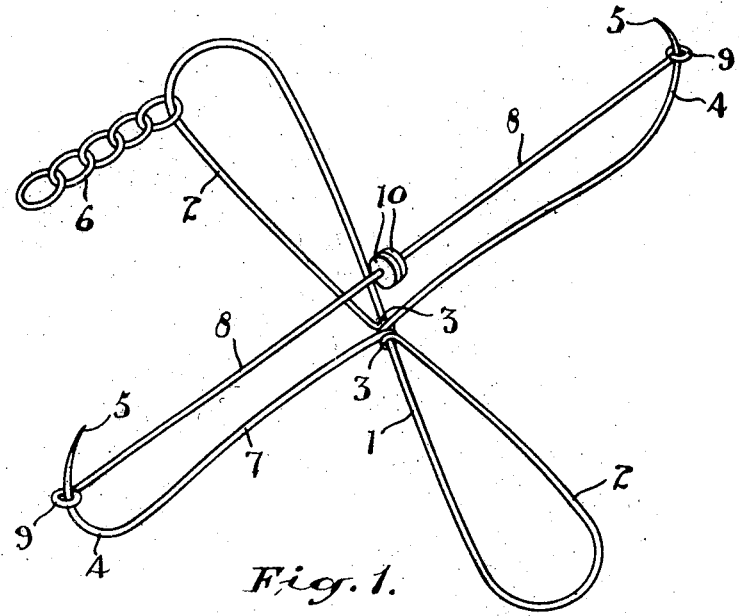

In the drawings Figure 1 is a perspective view of my improved trap shown with the impaling members set apart and ready to be sprung.

Figure 2:
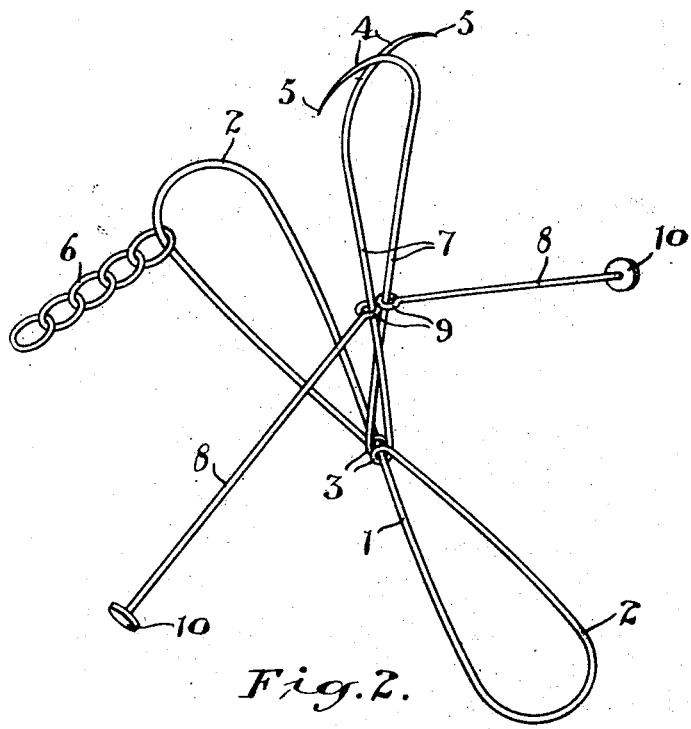

Fig. 2 is a perspective view showing the trap sprung and the impaling members closed together.

Referring to the accompanying drawings it will be seen that the trap is formed of a continuous length of wire, the central portion 1 thereof being straight and extending into the loops 2. The ends of the loops are returned to the central portion and wound therearound as shown at 3 in coiled spring formation and the ends are continued outwardly in transverse arrangement in relation to the loops. These transversely extending portions are formed with hooked shaped outer ends 4 terminating in the impaling points 5 which are turned inwardly and toward each other.

The loops 2 form the base of the trap and a suitable chain 6 or other fastening means may be secured to either one of them.

The spring arms 7 forming the lateral extensions having the impaling hooks, are adapted when released to extend upwardly so that the hook ends 4 cross over each other and so that they will have considerable spring tension when spread apart, therefore insuring the positive holding of the members in the animal that is trapped.

In setting the trap the arms 7 are sprung outwardly into the position shown in Fig. 1 and are held in the extended position by means of a pair of rods 8, each formed with I-shaped ends 9 loosely encircling the hook ends 4 and having on their opposite and inner ends the flat disks 10 which are adapted to be placed together face to face. The disks are of sufficiently large diameter to hold the rods 8 in alinement and the spring ends of the trap are thus held apart.

It will be readily understood that a very slight touch upon the rods 8 will throw them out of alinement and the spring action of the arms 7 will cause the hook ends to immediately spring together and catch the animal. The supporting rods 8 are shown in Fig. 2 simply in a loose position following the release of the impaling members.

A trap such as described is extremely light and a trapper operating over a large district may carry a considerable number of these with ease, which is a very important feature. The construction of the trap is such that it is very easy to conceal and the peculiar manner of springing the trap renders it extremely sensitive.

What I claim as my invention is:—

1. A trap comprising a base, a pair of spring impaling members rotatably connected centrally of said base adapted to be spaced apart in spring tension and upon release to rotate in a plane transversely of said base, and a pair of rods pivotally and slidably encircling the longitudinal portions of said impaling arms and adapted to be set with their free ends abutting to hold the impaling members apart.

2. A trap comprising a length of spring wire formed into a pair of oppositely arranged loops forming a base, the end portions being wound in spring form around the central portion and having their outer ends formed into hook shape and adapted to spring together, and a pair of members loosely connected to said outer hook members and adapted to be abutted to hold the spring ends apart.

J. A. DAVIDSON.

Copies of this patent may be obtained for five cents each, by addressing the "Commissioner of Patents, Washington, D. C."